V. HENRI, A. HELBRONNER & M. VON RECKLINGHAUSEN.
APPARATUS FOR THE TREATMENT OF WATER AND OTHER LIQUIDS BY ULTRA-VIOLET RAYS.
APPLICATION FILED NOV. 10, 1913.
1,132,266.  Patented Mar. 16, 1915.
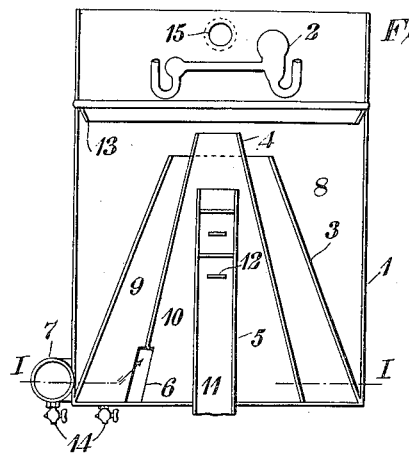
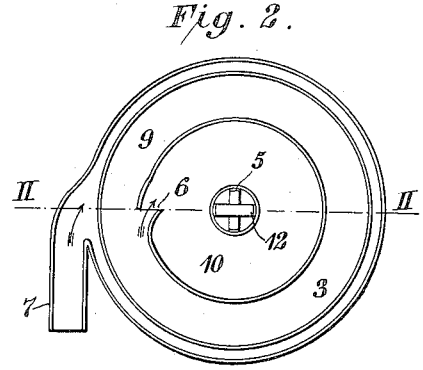
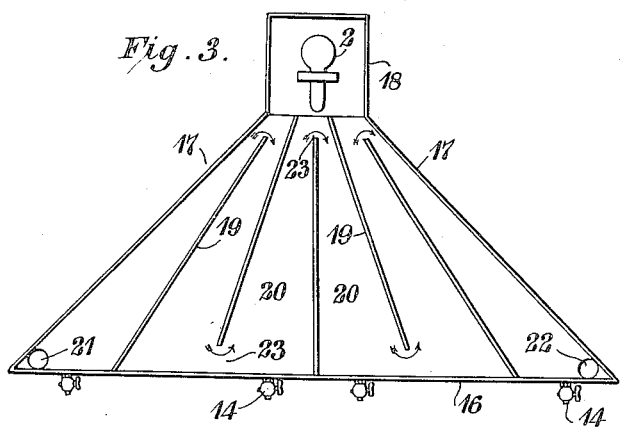
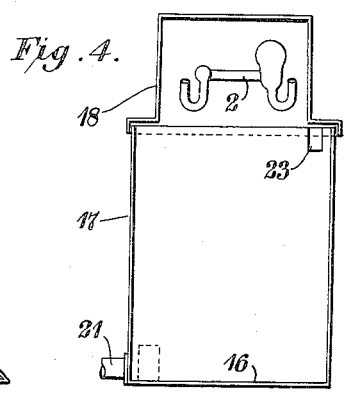
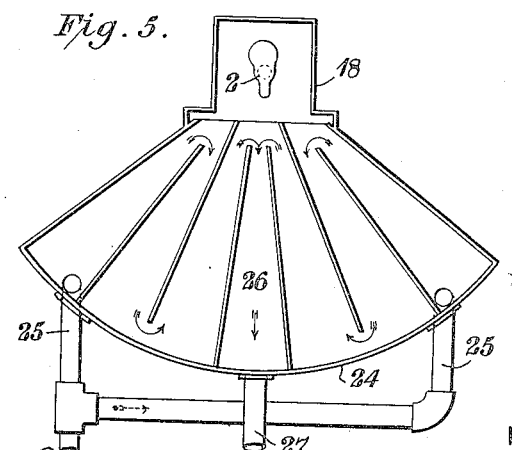
WITNESSES:
Wm Bohleber
Hugo B Polson
INVENTORS:
Victor Henri
André Helbronner
Max von Recklinghausen
By
Kerr Page Cooper & Hayward

UNITED STATES PATENT OFFICE.

VICTOR HENRI, OF PARIS, AND ANDRÉ HELBRONNER AND MAX VON RECKLINGHAUSEN, OF SURESNES, FRANCE, ASSIGNORS, BY MESNE ASSIGNMENTS, TO THE R. U. V. COMPANY, INC., A CORPORATION OF NEW YORK.

APPARATUS FOR THE TREATMENT OF WATER AND OTHER LIQUIDS BY ULTRA-VIOLET RAYS.

1,132,266.  Specification of Letters Patent.  Patented Mar. 16, 1915.

Original application filed October 31, 1910, Serial No. 589,995. Divided and this application filed November 10, 1913. Serial No. 800,047.

*To all whom it may concern:*

Be it known that we, VICTOR HENRI, a citizen of the French Republic, residing at Paris, France, ANDRÉ HELBRONNER, a citizen of the French Republic, residing at Suresnes, France, and MAX VON RECKLINGHAUSEN, a subject of the German Emperor, residing at Suresnes, France, have invented a new and useful Improvement in Apparatus for the Treatment of Water and other Liquids by Ultra-Violet Rays, of which the following is a specification, this application being a division of application Serial No. 589,995, filed October 31, 1910.

This invention relates to the treatment and sterilization of liquids by means of ultra-violet rays, and particularly to the sterilization of such liquids as are only slightly or not at all opaque to the rays, and has for its object the construction of apparatus suitable for the purpose.

It has already been proposed to sterilize water by means of ultra-violet rays produced by a mercury vapor lamp having a container of a material through which these rays will pass, quartz, silica and some special qualities of glass being examples of such material and in our application for Letters Patent Serial No. 565611 we have described apparatus of this kind in which the liquid is allowed to flow through an open conduit in a zigzag undulating or circular manner. In one form of apparatus baffle plates are employed for the purpose of causing the liquid to approach and recede from the source of the rays. It has been found that in order to secure the greatest efficiency it is necessary that the water or other liquid while under the influence of the ultra-violet rays should be thoroughly agitated or stirred and that the baffle plates used should not cast shadows and the present invention has for its object to provide improved apparatus whereby this result will be readily achieved.

According to the present invention the apparatus is provided with baffle plates adapted to guide and circulate the liquid as it is flowing through the sterilizing chamber, which are arranged radially with reference to the position of the source of ultra-violet rays employed so that no shadows are formed in the apparatus and no particles of liquid passing through the sterilizing chamber can escape being subjected to the action of the rays.

In order that the nature of our invention may be clearly understood we will now describe, with reference to the accompanying drawings, several forms of construction of the apparatus by way of example.

Figure 1 is a view in sectional elevation of a sterilizing chamber on the line II—II of Fig. 2 which is a section on the line I—I of Fig. 1, Figs. 3 and 4 are sectional elevations of a modified form of construction and Fig. 5 is a view in sectional elevation of another form of the apparatus.

The form of apparatus shown in Figs. 1 and 2 comprises a cylindrical tank 1 in the upper part or cover of which the lamp 2 is located. In the lower part of the apparatus partitions or baffles 3 and 4 are arranged in the form of truncated cones lying one within the other, the innermost 4 of these cones being preferably made of the greatest height. A centrally located tube 5 leads from the innermost cone through the bottom of the tank and forms the delivery pipe of the apparatus. One or more apertures 6 are provided in certain of the inner cones to permit the water to pass therethrough. The inlet for the water is shown at 7, and is so arranged that water is admitted to the outer compartment 8 of the tank in a tangential direction so that it flows through the compartment with a circular motion until it reaches such a height that it flows over the edge of the outermost cone 3 into the inner compartment 9, where the rotary motion is continued. At the bottom of this compartment it passes through the aperture 6 into a central compartment 10, where it rises until it overflows into the delivery tube 5 and flows away from the outlet 11. The delivery tube is provided with cross baffle plates 12 for the purpose of checking too violent rotary motion of the liquid. Near the top of the cylindrical tank a baffle plate 13 is arranged to prevent the water creeping up the sides of the apparatus into the cover of the same. As shown in Fig. 1 the lamp 2 is located in such a position that the light proceeds approximately from the apex of the truncated cones so that the baffle plates 3 and 4 do not cast shadows and the light has free access to all parts of the liquid. The circular motion which is given to the water as it passes through the apparatus causes it to be thoroughly agitated which, as has already been pointed out, is necessary in order that the liquid may be efficiently sterilized. In order to insure the greatest possible movement of the liquid the apparatus is arranged so that the water flows past one baffle plate at or near the top, and past the next baffle plate at or near the bottom and so on alternately. Furthermore the apertures provided in adjacent baffle plates are not placed in the same vertical or horizontal line but diagonally or staggered with respect to one another. Drain cocks 14 are provided in order that the apparatus may be emptied at any time when it is not required for use so that the water may not get stagnant therein. A window is provided as shown at 15 in order that the operation of the lamp may be watched. In a sterilizing element of this type the water flows through the apparatus by virtue of the pressure in the water mains and may be collected in a cistern. The cover of the tank is not hermetically sealed so that the lamp operates in air at ordinary atmospheric pressure and no device is necessary for making up any deficiency of air. If desired the lamp may be mounted on a frame in such a way that it can be tilted from the outside of the apparatus without removing the cover of the tank.

In another form of construction Figs. 3 and 4, the container or tank has a rectangular base 16, two of the sides 17 converging toward the hood 18 where the lamp 2 is located. Baffle plates 19 are arranged in a radial direction from the lamp toward the base of the apparatus so as to form a number of compartments 20. The water enters near the bottom of the tank at 21 and passes successively through the compartments 20 until it reaches the outlet 22. The apertures 23 leading from one compartment to the next are arranged alternately in the top and bottom of the baffle plates 19. Drain cocks 14 are also provided for emptying the chambers of water when the apparatus is not in use.

In the modification of the apparatus shown in Fig. 5 the tank has a curved base 24, the liquid being admitted by the two inlets 25 into the two outermost compartments. The water flows through the various chambers as shown by the arrows toward the center of the sterilizing element until it reaches the innermost compartment 26 from whence it flows away by the outlet 27.

The interior walls, baffle or division plates and so forth throughout the various forms of the apparatus constructed in accordance with this invention are preferably made of or coated with material which will present a reflecting surface so that the rays which pass through the liquid are caused to retraverse the same and are therefore utilized to their fullest extent. Reflectors may, if desired, be placed above the source of the rays so as to reflect the rays toward the liquid to be sterilized.

Throughout this specification we have used the term sterilization in connection with apparatus suitable for carrying out this object, but we wish it to be understood that we claim the use of the various forms of apparatus herein described and modifications thereof for treating liquids generally with ultra-violet rays.

We claim as our invention:

1. In apparatus for treating liquids by means of ultra-violet rays, the combination of a receptacle through which the liquid to be treated is caused to pass, a source of ultra-violet rays located above said receptacle, and baffle plates arranged so that their surfaces are at an angle with each other and parallel with the direction of the ultra-violet rays.

2. In apparatus for treating liquids by means of ultra-violet rays, the combination of a receptacle through which the liquid to be treated is caused to pass, a source of ultra-violet rays which is smaller than the base of said receptacle located above the same and radial baffle plates in said receptacle radiating from the source of ultra-violet rays and adapted not to shade any part of the interior thereof from the ultra-violet rays.

3. In apparatus for treating liquids by means of ultra-violet rays, the combination of a receptacle through which the liquid to be treated is caused to pass, a source of ultra-violet rays located above said receptacle, and cone-shaped baffles for directing the liquid to be treated in its passage through the receptacle.

4. In apparatus for treating liquids by means of ultra-violet rays, the combination of a receptacle having a circular base through which the liquid to be treated is caused to pass, a source of ultra-violet rays located above said receptacle and an inlet pipe for the liquid to be treated arranged tangentially to the circular base.

5. In apparatus for treating liquids by means of ultra-violet rays, the combination of a receptacle through which the liquid to be treated is caused to pass, baffles adapted to direct the liquid upward and downward in its passage through said receptacle and a horizontal inlet pipe adapted to give the liquid a lateral movement additional to its vertical movement while undergoing treatment.

6. In apparatus for treating liquids by means of ultra-violet rays, the combination of a receptacle through which the liquid to be treated is caused to pass, a source of ultra-violet rays located above said receptacle, an inlet pipe tangentially arranged at the side of said receptacle and an outlet pipe extending nearly to the top of said receptacle and having its axis substantially vertical under the source of the rays.

7. In apparatus for treating liquids by means of ultra-violet rays, the combination of a receptacle having a circular base through which the liquid to be treated is caused to pass, a source of ultra-violet rays located above said receptacle, an inlet pipe tangentially arranged at the side of said receptacle and an outlet pipe in the center of the base.

8. In apparatus for treating liquids by means of ultra-violet rays, the combination of a receptacle through which the liquid to be treated is caused to pass, a source of ultra-violet rays located above said receptacle and baffle plates in said receptacle arranged so that their lines of intersection with a vertical plane are not parallel with each other with openings alternately at the tops and bottoms of said baffle plates to cause the liquid to be treated to pass upward and downward therebetween.

9. In apparatus for treating liquids by means of ultra-violet rays, the combination of a receptacle through which the liquid to be treated is caused to pass, baffle plates in the form of truncated cones lying one within the other in said receptacle, means for admitting the liquid to be treated near the periphery of the tank in a tangential direction, means for causing said liquid to pass over and through the baffle plates alternately, an outlet pipe co-axial with the truncated conical baffles and a source of ultra-violet rays located approximately at the apex of the truncated conical baffle plates.

10. In an apparatus for treating liquids by means of ultra violet-rays, in combination, a receptacle through which the liquid to be treated is adapted to pass, a source of ultra-violet rays located above said receptacle, and baffles for agitating and directing the liquid to be treated in its passage through said receptacle, the walls of the baffles and the interior walls of said receptacle made of a material that will present a reflecting surface whereby the rays are caused to retraverse the liquid and are thereby utilized to their fullest extent.

In testimony whereof we have hereunto subscribed our names this tenth day of May, 1913.

VICTOR HENRI.
ANDRÉ HELBRONNER.
MAX von RECKLINGHAUSEN.

Witnesses:
Hanson C. Coxe,
John Baker.